US011722903B2

(12) United States Patent
Ratts et al.

(10) Patent No.: US 11,722,903 B2
(45) Date of Patent: Aug. 8, 2023

(54) ENVIRONMENTAL VERIFICATION FOR CONTROLLING ACCESS TO DATA

(71) Applicants:Steven D. Ratts, Indian Harbour Beach, FL (US); Brian J. Noe, Indian Harbour Beach, FL (US); Kathryn E. Schmidt, Melbourne, FL (US); Alexander J. Voce, Melbourne, FL (US); Albert C. Stevens, St. Augustine, FL (US); Michael Scholz, Melbourne, FL (US)

(72) Inventors: Steven D. Ratts, Indian Harbour Beach, FL (US); Brian J. Noe, Indian Harbour Beach, FL (US); Kathryn E. Schmidt, Melbourne, FL (US); Alexander J. Voce, Melbourne, FL (US); Albert C. Stevens, St. Augustine, FL (US); Michael Scholz, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 160 days.

(21) Appl. No.: 17/226,552

(22) Filed: Apr. 9, 2021

(65) Prior Publication Data
US 2022/0330031 A1 Oct. 13, 2022

(51) Int. Cl.
*H04W 12/65* (2021.01)
*H04W 12/63* (2021.01)
(Continued)

(52) U.S. Cl.
CPC ............ *H04W 12/65* (2021.01); *G06F 21/62* (2013.01); *G06F 21/71* (2013.01); *H04W 12/08* (2013.01); *H04W 12/63* (2021.01)

(58) Field of Classification Search
CPC ..... H04W 12/08; H04W 12/63; H04W 12/65; H04L 67/12; H04L 63/107; G06F 21/62; G06F 21/71
See application file for complete search history.

(56) References Cited

U.S. PATENT DOCUMENTS

| 4,992,656 A | 2/1991 | Clauser |
| 5,808,197 A | 9/1998 | Dao |

(Continued)

OTHER PUBLICATIONS

Other Global Navigation Satellite Systems. GPS.gov. Retrieved on Nov. 8, 2022. (Year: 2022).*

(Continued)

*Primary Examiner* — Robert B Leung
(74) *Attorney, Agent, or Firm* — Tarolli, Sundheim, Covell & Tummino LLP

(57) ABSTRACT

A system for controlling access to data based on environmental verification can include a physical environment authenticator that receives data characterizing environmental parameters of a node in an environment from a set of environmental sensors. The physical environment authenticator can compare correlated environmental parameters with each other and/or a threshold value. At least a subset of the correlated environmental parameters are based on the data from the set of environmental sensors and grants access to a data if the correlated environmental parameters indicate that the node is operating in an authorized environment and prevents access to the data if the correlated environmental parameters indicates that the node is not operating in an authorized environment.

34 Claims, 8 Drawing Sheets

(51) Int. Cl.
*H04W 12/08* (2021.01)
*G06F 21/62* (2013.01)
*G06F 21/71* (2013.01)

(56) References Cited

U.S. PATENT DOCUMENTS

| | | | |
|---|---|---|---|
| 5,822,226 | A | 10/1998 | Watkins et al. |
| 6,427,122 | B1 | 7/2002 | Lin |
| 6,493,631 | B1 | 12/2002 | Burns |
| 7,042,867 | B2 | 5/2006 | Whitehill et al. |
| 7,278,056 | B2 | 10/2007 | Hekmatpour |
| 7,370,233 | B1 | 5/2008 | Sobel et al. |
| 7,509,216 | B2 | 3/2009 | Huddle |
| 7,984,648 | B2 | 7/2011 | Horning et al. |
| 8,032,760 | B2 | 10/2011 | Tuyls et al. |
| 8,549,584 | B2 | 10/2013 | Singh et al. |
| 8,874,916 | B2 | 10/2014 | Smith et al. |
| 9,119,068 | B1 | 8/2015 | Hubble |
| 9,256,715 | B2 | 2/2016 | Draluk et al. |
| 9,455,964 | B2 | 9/2016 | Mower |
| 9,703,579 | B2 | 7/2017 | Suresh et al. |
| 9,760,696 | B2 | 9/2017 | Chen |
| 10,459,086 | B2 | 10/2019 | Cruddace et al. |
| 10,476,888 | B2 | 11/2019 | Chung et al. |
| 10,484,395 | B2 | 11/2019 | Schaer et al. |
| 2003/0073406 | A1* | 4/2003 | Benjamin .............. H04L 67/12 340/901 |
| 2009/0300049 | A1 | 12/2009 | Zhang et al. |
| 2013/0318486 | A1 | 11/2013 | Sasaki |
| 2014/0095876 | A1 | 4/2014 | Smith et al. |
| 2015/0012737 | A1 | 1/2015 | Newell |
| 2015/0264572 | A1* | 9/2015 | Turgeman .............. G06F 3/038 455/411 |
| 2017/0012983 | A1* | 1/2017 | Smith .................... H04L 63/10 |
| 2017/0041145 | A1* | 2/2017 | Sinchak ............... H04L 63/083 |
| 2017/0140153 | A1* | 5/2017 | Zimmer ................. H04L 9/302 |
| 2017/0277868 | A1* | 9/2017 | Anantharaman ..... G06F 21/316 |
| 2018/0041341 | A1 | 2/2018 | Gulati |
| 2019/0014113 | A1* | 1/2019 | Khosravi ........... H04L 63/0861 |
| 2019/0109875 | A1 | 4/2019 | Urmanov et al. |
| 2019/0253404 | A1* | 8/2019 | Briceno ............... H04L 63/205 |
| 2022/0060481 | A1* | 2/2022 | Lopez Mendez ..... H04W 12/08 |

OTHER PUBLICATIONS

L. Gomez, L. Moraru, D. Simplot-Ryl and K. Wrona, "Using Sensor and Location Information for Context-Aware Access Control," EUROCON 2005—The International Conference on "Computer as a Tool", Belgrade, Serbia, 2005, pp. 68-71, doi: 10.1109/EURCON.2005.1629860. (Year: 2005).*

International Search Report from corresponding PCT/US2022/017853 dated Jun. 7, 2022.

Non Final Office Action for U.S. Appl. No. 16/425,614 dated May 7, 2021.

* cited by examiner

ENVIRONMENTAL VERIFICATION FOR CONTROLLING ACCESS TO DATA

TECHNICAL FIELD

The present disclosure relates to data access. More particularly, this disclosure relates to systems and methods for controlling access to data with environmental verification.

BACKGROUND

A secure computing platform (also referred to as a secure cryptoprocessor) is a dedicated computer-on-a-chip or microprocessor for carrying out cryptographic operations, embedded in a packaging with multiple physical security measures, which give a secure computing platform a degree of tamper resistance. A Trusted Platform Module (TPM) is an international standard for a secure computing platform. A TPM can be implemented as a dedicated microcontroller designed to secure hardware through integrated cryptographic keys.

A secure computing platform includes onboard secure cryptographic key generation, storage and management. Additionally, the secure computing platform can employ such keys to execute decryption and encryption of content. In this manner, a secure computing platform can employ a secret key (e.g., an asymmetric key of an asymmetric key pair or a symmetric key) to encrypt and/or decrypt data without revealing the secret key to an external source.

SUMMARY

One example relates to a system for controlling access to data based on environmental verification. The system can include a non-transitory memory having machine executable instructions and a processing unit for accessing the machine readable instructions. The machine readable instructions can include a physical environment authenticator that receives data characterizing environmental parameters of a node in an environment from a set of environmental sensors. The physical environment authenticator can compare correlated environmental parameters with each other and/or a threshold value. At least a subset of the correlated environmental parameters are based on the data from the set of environmental sensors and grants access to data if the correlated environmental parameters indicate that the node is operating in an authorized environment and prevents access to the data if the correlated environmental parameters indicates that the node is not operating in an authorized environment.

Another example relates to a non-transitory machine readable medium having machine executable instructions. The machine executable instructions can include a physical environment authenticator that receives a request for access to data from a node and captures, in response to the request, data characterizing a plurality of environmental parameters of the node from a set of environmental sensors. The physical environment authenticator can also compare the plurality of correlated environmental parameters with each other and/or a threshold value. At least a subset of the correlated environmental parameters are based on data from the sets of environmental sensors and grants access to data if the plurality of correlated parameters from each of the plurality of environmental sensors indicate that the node is operating in an authorized environment and denies access to the data if at least one of the environmental parameters indicates that the node is not operating in the authorized environment.

Yet another example relates to a method for controlling access to data based on environmental verification. The method can include receiving, by a physical environment authenticator executing on a secure computing platform, a request for access to data from a node. The method can also include capturing, by the physical environment authenticator, in response to the request, data characterizing a plurality of environmental parameters of the node from a set of environmental sensors. The method can further include comparing, by the physical environment authenticator, a plurality of correlated environmental parameters with each other and/or a threshold value. At least a subset of the correlated environmental parameters are based on data from the set of environmental sensors. The physical environment authenticator grants access to data if the plurality of correlated parameters from each of the set of environmental sensors indicate that the node is operating in an authorized environment and denies access to the data if at least one of the environmental parameters indicates that the node is not operating in the authorized environment.

DETAILED DESCRIPTION

The present application is related to systems and methods for employing an environmental verification process to control access to data. More particularly, the present application relates to systems to verify unique and characteristic physical environmental conditions that are difficult (or infeasible) to spoof, and are thus used as a basis to control access to the data. Such a system can be employed to reliably verify complex sets of correlated environmental parameters to grant (or deny) access to a secret key that is needed to decrypt an encrypted form of the data. By robustly verifying the actual operational environmental conditions present and previously observed, the systems and methods described herein improves cybersecurity performance for systems which are required to constrain access to data when operating prior to or outside of an authorized environment.

More generally, the system can analyze and compare a plurality of correlated environmental parameters provided from a set of environmental sensors to determine if access to the secret key (employable to decrypt data) is authorized. The sets of environmental parameters can be any environmental parameters where two or more of the parameters are correlated in such a way that measurements taken across the plurality of parameters becomes resistant to spoofing of the environment such that the plurality of parameters reflect the actual environment being observed.

As one example of implementation, a system can employ the environmental verification process to control the release of encrypted data so that such data is only decrypted after the system has verified that the system is currently operating in or has previously observed an authorized environment which is characterized by the plurality of correlated environmental parameters. In some examples, the plurality of environmental parameters can be directly compared. In other examples, the system can be correlated with application of the laws of physics to make spoofing the authorized environment infeasible, and thus reliably verify the environment.

Some systems (e.g., satellites) are intended to perform specific functions or access specific data only after they reach a particular authorized environment (e.g., a particular operational physical environment, such as in orbit or sub-orbit around a celestial body), and upon reaching the authorized environment, such systems need access to data that is encrypted. Furthermore, in some instances, such systems have spent time previously in other different physical environments while in route to the authorized environment. In conventional approaches, in these situations, an unauthorized party (e.g., a thief or adversarial party) that has obtained physical access to such a system would typically not be able to replicate the authorized environment, such that efforts to reveal the data in unencrypted form is impeded and/or thwarted.

Figure 1:
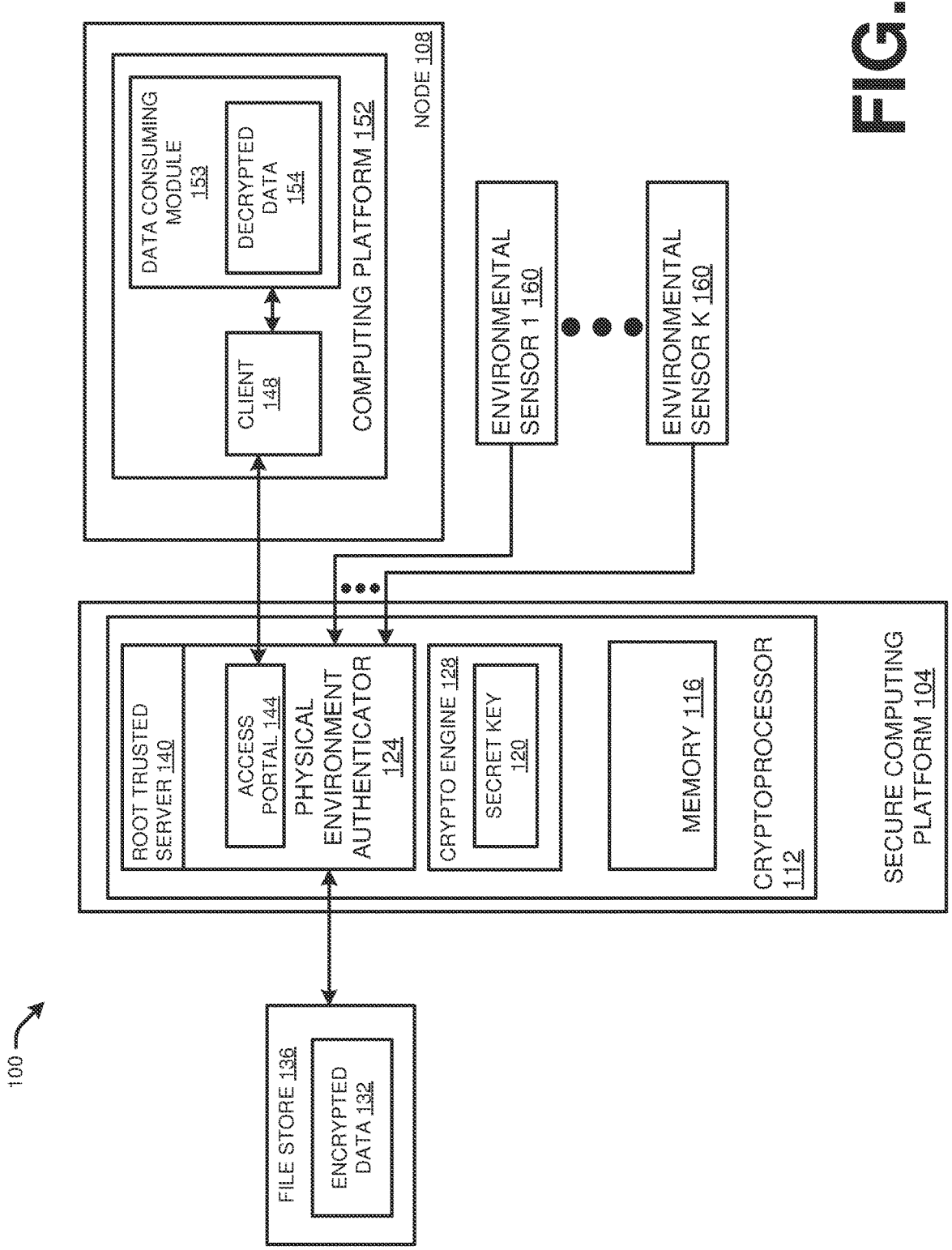
FIG. 1 illustrates an example of a system that employs environmental verification to control access to data.

FIG. 1 illustrates an example of a system 100 that employs environmental verification to control access to data. The data can be stored in a file, and in some examples, the data can be secure data. As used herein, the term "file" could correspond to a single digital file or multiple digital files. Additionally, the file can be nearly any consumable file format, including a data file, an executable file, a text file, etc.

The system 100 can include a secure computing platform 104 that can interact with a node 108. The secure computing platform 104 can be implemented as a computing device, such as a single board computer. In some examples, the secure computing platform 104 can be physically embedded in the node 108. In other examples, the secure computing platform 104 can be external to the node 108, including situations where the secure computing platform 108 is mounted on an exterior of the node 108 or in situations where the secure computing platform 104 is spaced apart from the node 108 and the secure computing platform 104 communicates with the node 108 through wireless communications. As some examples, the node 108 can be implemented as a hardware device for deployment in a particular environment. As some examples, the node 108 can be implemented as a vehicle (terrestrial vehicle or an aircraft), a rocket, a weapon (e.g., a missile), etc. In some examples, theft of the node 108 can represent a national security risk.

The secure computing platform 104 can include a cryptoprocessor 112. The crypto processor 112 can represent a collection of IC chips and/or other electrical components operating in concert, or the cryptoprocessor 112 can be implemented with a single IC chip. The secure computing platform can include memory 116. In some examples, the memory 116 can be non-transitory machine readable secure memory that is embedded in cryptoprocessor 112. Additionally, in some examples, a partition of the memory 116 can be external to the cryptoprocessor 112. The memory 116 can store data and machine-readable instructions. The cryptoprocessor 112 can access the memory 116 and execute machine-readable instructions. The cryptoprocessor 112 can be a general-purpose processor that specializes in encryption and decryption of data. The memory 116 can store a secret key 120. The secret key 120 can be a symmetric key or an asymmetric key. In either situation, the secret key 120 is not revealed to an outside entity. Instead, the secure computing platform 104 includes a physical environment authenticator 124 and a crypto engine 128 that can be leveraged to employ the secret key 120 to decrypt data and/or to encrypt data.

More particularly, the system 100 includes encrypted data 132 that can only be decrypted with the secret key 120. The encrypted data 132 can be an encrypted form of the data. In some examples, the secret key 120 (or a copy of the secret key 120) could have been employed to encrypt the encrypted data 132. In other examples, a complement of the secret key 120 (e.g., an asymmetric key of a asymmetric key pair) can be employed to encrypt the encrypted data 132 and/or the secret key 120 is employable to encrypt data that is only decryptable by the complement of the secret key 120. In any such situation, without access to the secret key 120 the encrypted data 132 is unintelligible. In some examples, the encrypted data 132 can be stored on a file store 136. In some examples, the file store 136 can be embedded in the secure computing platform 104 for the node 108. In other examples, the file store 136 can be external to the secure computing platform 104 and the node 108. For instance in one example, the file store 136 can communicate wirelessly with the secure computing platform 104, and the encrypted data 132 (in encrypted form) can be provided to the secure computing platform 104.

The cryptoprocessor 122 can include a root trusted server 140. The root trusted server 140 can represent hardware (e.g., a field programmable gate array (FPGA), an application specific integrated circuit (ASIC) chip, etc.), software (e.g., machine executable instructions stored in the memory 116) or a combination thereof. The root trusted server 140 can monitor operations of the secure computing platform 104. The root trusted server 140 is employable to implement a trusted boot on the secure computing platform 104. In some examples, the root trusted server 140 includes digitally signed (e.g. a digital signature certificate) machine-readable instructions (e.g. signed by a trusted authority) that can ensure that the secure computing platform 104 only executes trusted operations. In some examples of this situation, the physical environment authenticator 124 and the crypto engine 128 can also be digitally signed and the root trusted server 140 can verify that the physical environment authenticator 124 and the crypto engine 128 have not been modified prior to execution by the cryptoprocessor 112. In other examples, the crypto engine 128 can be implemented as a hardware device (e.g., an FPGA or an ASIC), such that the crypto engine 128 does not need to be digitally signed. In any such situation, the root trusted server 140 can ensure that the secure computing platform 104 only executes authorized operations.

The physical environment authenticator 124 can include an access portal 144. The access portal 144 can receive requests for decryption of the encrypted data 132 from a client 148 executing at the node 108. The client 148 can be executed on a computing platform 152 of the node 108. The computing platform 152 of the node 108 can include, for example a memory for storing data and machine-readable instructions, and a processing unit (e.g., one or more processor cores) for accessing the memory and executing the machine-readable instructions. For purposes of simplification of explanation, some features of the computing platform 152 are omitted.

In some examples, the client 148 can generate the request for decryption of the encrypted data 132, in response to requests from a data consuming module 153 (e.g., application software) executing on the computing platform 152. In other examples, the client 148 can generate the request without interaction with the data consuming module 153 and/or the client 148 can be integrated with the data consuming module 153. In response to receipt of the request to decrypt the encrypted data 132, the physical environment authenticator 124 can execute an environmental verification process. The environmental verification process verifies that the node 108 is located within the expected environment at the time the request to decrypt the encrypted data 132 is received.

To execute the environmental verification process, the physical environment authenticator 124 compares data characterizing the environment of the implementation for the node 108 from two different sources. Accordingly, the system 100 can include K number of environmental sensors 160, where K is an integer greater than or equal to one. That is, the K number of environmental sensors 160 provides a set of environmental sensors 160. Each of the K number of environmental sensors 160 measures a different type of environmental parameter and provides the data to the physical environment authenticator 124. As one example, one environmental sensor 160 could be a temperature sensor, a pressure sensor or a flow meter, and another environmental sensor 160 could be an accelerometer. As another example, one environmental sensor 160 could be an inertial measurement unit (IMU) and another environmental sensor 160 could be a global navigation satellite system (GNSS) receiver (or other position sensor). As yet another example, one environmental sensor 160 could be an orientation sensor (e.g., a three-axis gyroscope, or a Micro-Electro-Mechanical Systems (MEMS) gyroscope) and another environmental sensor 160 could be an accelerometer or a velocity meter. In still other examples, one environmental sensor 160 can be a deformation meter and another can be an accelerometer. This list is not meant to be exhaustive. In the various examples including the examples described herein, any two environmental sensors that measure correlated environmental parameters can be employed.

Each of the K number of environmental sensors 160 (or some subset thereof) can be integrated or external to the node 108 (physically detached from the node 108). In examples where a given environmental sensor 160 is external to the node 108, the physical environment authenticator 124 can receive data (directly or indirectly) from the given environmental sensor 160 wirelessly through a secure communications channel. For instance, in a situation where the given environmental sensor 160 is a velocity meter (e.g., an infrared velocity meter), an external entity (e.g., a drone) can have the given environmental sensor 160 mounted thereon, and provide the data characterizing the velocity of the node 108 to the physical environment authenticator 124. In other examples, each of the K number of environmental sensors 160 (or some subset thereof) can be formed on an integrated circuit (IC) chip, such as an application specific integrated circuit (ASIC) chip.

Each of the K number of environmental sensors 160 provides data characterizing a parameter of the environment in which the node 108 is implemented at or near the time the request for decryption of the decrypted data is provided to the physical environment authenticator 124, and these parameters are referred to as environmental parameters. During the environmental verification process, the physical environment authenticator 124 can capture and compare data characterizing different, but correlated environmental parameters with each other and/or corresponding threshold values (or a single threshold value) to determine if the node 108 is operating in an authorized environment. In some examples, such as a situation where the system 100 includes only one environmental sensor 160, the environmental sensor 160 can be configured to measure two or more different environmental parameters and provide the data for the two or more different environmental parameters to the physical environment authenticator 124. In other examples, there are multiple environmental sensors 160 that each operate independently. Furthermore, in some examples, a particular environmental parameter, such as time may not originate from one of the K number of environmental sensors 160, but from another component of the system 100, such as a clock in the secure computing platform 104 or a clock at the node 108.

As noted, the data for the two different environmental parameters is correlated. In some examples, the physical environment authenticator 124 can format, transform and/or fuse one or more of the two different environmental parameters to form a common environmental parameter. For instance, if one environmental sensor 160 is an accelerometer and another environmental sensor 160 is a position sensor, the physical environment authenticator 124 could integrate data from the accelerometer and derive data from the position sensor to determine a velocity (the same environmental parameter) based on the data from both such environmental sensors 160. That is, the physical environment authenticator 124 can employ equations to apply the laws of physics to change units of particular physical parameters and/or to combine multiple physical parameters (e.g., position and time) to transform the multiple physical parameters into another physical parameter (e.g., velocity).

In some examples, if the data characterizing the plurality of correlated environmental parameters is within an acceptable range (based on a comparison between environmental parameters and/or based on a comparison with corresponding threshold values), the physical environment authenticator 124 retrieves the encrypted data 132 and provides the encrypted data to the crypto engine 128, and the physical environment authenticator 124 provides a notification to the crypto engine 128 that the node 108 is authorized to decrypt the encrypted data 132. In response, the crypto engine 128 accesses the secret key 120 and decrypts the encrypted data 132 with the secret key 120, and the crypto engine 128 returns decrypted data 154 to the physical environment authenticator 124. The physical environment authenticator 124 can provide the decrypted data 154 to the client 148 in response to the request to decrypt the encrypted data 132. In this manner, the decrypted data 154 can be consumed by the node 108, such as the data consuming module 153 on the computing platform 152.

Conversely, in a situation where the comparison of the data characterizing the environmental parameters provided by the K number of environmental sensors 160 indicates that the node 108 is not located in an authorized environment, the physical environment authenticator 124 does not allow access to the secret key 120. In some situations, the physical environment authenticator 124 can provide the client 148 with a notification that access to the data (corresponding to the encrypted data 132 in unencrypted form) has not been authorized. In other examples, the physical environment authenticator 124 may not respond to the request for the data if the physical environment authenticator 124 cannot verify that the node 108 is located in an authorized environment.

Additionally or alternatively, in some examples, the physical environment authenticator 124 can score (e.g., assign scores to) the environmental parameters to determine if access to the secret key 120 (and therefore, the data) is authorized. For example, in such a situation, the physical authenticator 124 can apply a weighted score to each environmental parameter and compare each such score to a corresponding threshold. The scoring can be based, for example, an a predicted accuracy (e.g., due to noise) of each parameter. As one example, if M number of scores for environmental parameters meet or exceed the corresponding threshold, but N number of scores of environmental parameters do not meet the corresponding threshold, the physical environment authenticator 124 can grant access to the secret key 120 and to the data. In this situation, M is a selected integer greater than or equal to two and N is a selected integer greater than one, and M is greater than N. Continuing with this situation, if there are less than M scores that exceed the corresponding threshold scores, access to the secret key 120 and the data (in unencrypted form) is denied. In this manner, in certain situations where one or more environmental parameters fail to correlate with other environmental parameters (e.g., due to noise), access to the secret key 120 and the data may still be granted.

The system 100 can prevent an unauthorized party (e.g., a thief or adversarial party) that may physically possess the node 108 from accessing the secret key 120 and the encrypted data 132 in unencrypted form. As a given example (hereinafter, "given example") consider a situation where the node 108 is implemented as a rocket, a shear force is measured by a shear sensor (e.g., a first environmental sensor 160) and a skin temperature is measured by a temperature sensor (e.g., a second environmental sensor 160) and these environmental parameters are correlated. That is, in such a situation, the greater the shear force measured by the shear sensor, the greater the skin temperature (e.g., due to heat transfer from the combustion chamber coupled with atmospheric friction). Accordingly, continuing with the given example, suppose that the first environmental sensor 160 provides a shear force to the physical environment authenticator 124. The physical environment authenticator 124 can calculate an expected skin temperature for the shear force. Thus, in a situation where the skin temperature provided from the second environmental sensor 160 differs from the expected skin temperature by more than an acceptable range, the physical environment authenticator 124 can determine that the node 108 is not in an authorized environment. For instance, in the given example, if an unauthorized party possessing the node 108 were to mount the node 108 in a wind tunnel in order to simulate operation of the rocket, the skin temperature would not match the shear force, such that the physical environment authenticator 124 would prevent the unauthorized party from accessing the secret key 120, and therefore prevent the unauthorized party from decrypting the encrypted data 132, such that the unauthorized party would not be able to possess the data corresponding to the encrypted data 132.

FIGS. 2-11 illustrate examples of different types of environmental sensors (e.g., the K number of environmental sensors 160 of FIG. 1) that are employable to provide environmental parameters for the node 108 to the physical environment authenticator 124 of the system 100 of FIG. 1 that are employed during the environmental verification process. For purposes of simplification of explanation, some details are omitted from FIGS. 2-11.

Figure 2:
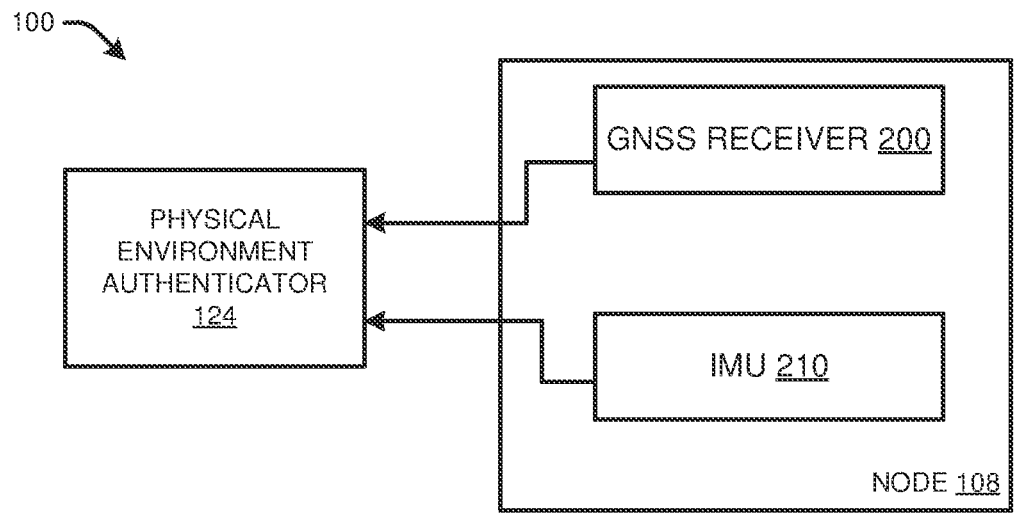
FIG. 2 illustrates an example of the system of FIG. 1 that includes a global navigation satellite system (GNSS) receiver and an inertial measurement unit (IMU).

More particularly, FIG. 2 illustrates an example of the system 100 that includes a global navigation satellite systems (GNSS) receiver 200 that provides data characterizing a position of the node 108 of FIG. 1 and an inertial measurement unit (IMU) 210 that provides data characterizing a position of the node (using dead reckoning) and a velocity of the node 108. In some examples, the physical environment authenticator 124 can determine the position of the node 108 as a function of time (e.g., where time can be an environmental parameter) to confirm or refute that the node 108 is either currently inside or outside of some bounds (geolocation) of an authorized environment during the environmental verification process. In other examples, the physical environment authenticator 124 can monitor the position of the node 108 as a function of time relative to a previous position of the node 108 to determine if the node 108 has traveled to the authorized environment during the environmental verification process.

The employment of the GNSS receiver 200 can produce time-correlated position measurements. Such measurements can then be differentiated to estimate velocity, which can be differentiated to estimate acceleration, and so are effectively able to monitor position vs time to estimate velocity and acceleration values. The employment of the IMU 210 can provide current position estimates of the node 108 that represent a integration of acceleration to provide an estimate of velocity of the node 108, and then integrating velocity of the node 108 to obtain position of the node 108, such that the physical environment authenticator 124 can effectively monitor acceleration versus time to estimate position and produce time-correlated position, velocity and acceleration values.

In other examples, position measurements from the GNSS receiver 200 and/or the IMU 210 can be correlated by the physical environment authenticator 124 with other measurements such as pressure, temperature, magnetic environment, etc. In fact, position of the node 108 can be correlated with any other environmental parameter which can be shown to depend on or relate to position during the environmental verification process.

Similarly, in other examples, the velocity of the node 108 can be sensed (measured) by a plurality of mechanisms, including such things as stagnation pressure (e.g. via a Pitot tube, etc.), or as a byproduct from the IMU 210, the GNSS receiver 200 or by a different type of environmental sensor (e.g., another environmental sensor 160 of FIG. 1). Thus, in some examples, during the authentication process, the physical environment authenticator 124 can correlate velocity, acceleration and position as noted. Additionally or alternatively, the velocity of the node 108 can also be correlated with pressure, temperature, mass flow rate of fuel consumed by an engine of the node 108, etc. In fact, the velocity of the node 108 can be correlated with any other environmental parameter which can be shown to depend on or relate to velocity.

Figure 3:
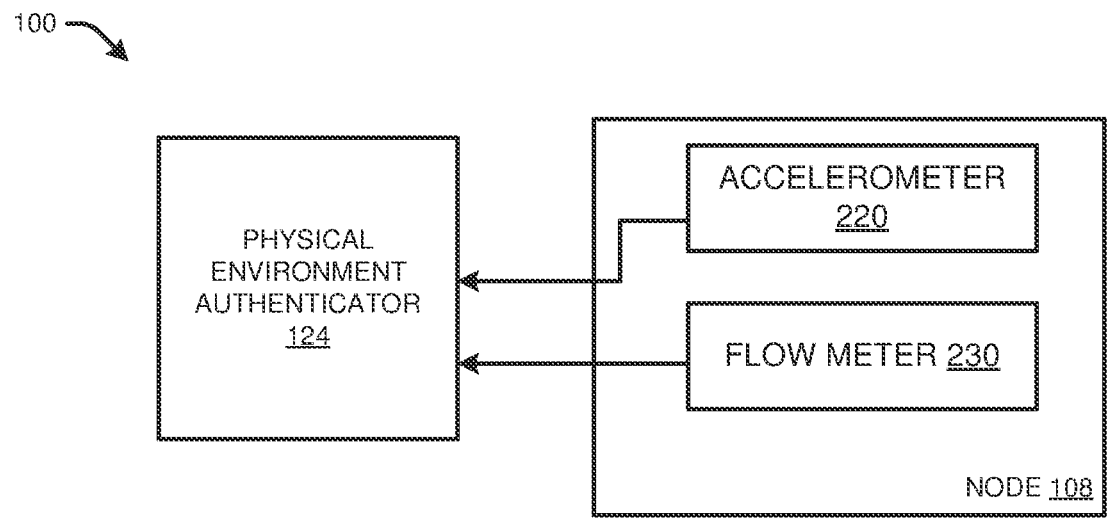
FIG. 3 illustrates an example of the system of FIG. 1 that includes an accelerometer and a flow meter.

FIG. 3 illustrates an example of the system 100 that includes an accelerometer 220 that provides an environmental parameter characterizing an acceleration of the node 108 to the physical environment authenticator 124 and a flow meter 230 that provides an environmental parameter characterizing a fuel consumed by the node 108 (e.g., by an engine combustion chamber of the node 108) to the physical environment authenticator 124. In such a situation, the physical environment authenticator 124 can correlate acceleration with the flow rate of fuel by calculating an expected fuel consumption for a reported acceleration. In situations where the flow meter 230 provides data indicating that the fuel is being consumed at an expected rate, the physical environment authenticator 124 can authenticate the environment of the node 108.

In alternative situations, instead of inclusion of the accelerometer 220 that measures the acceleration of the node 108 directly, in other examples, the acceleration of the node 108 can be derived from a measure of a position vs time (e.g., by the GNSS receiver 200 or the IMU 210 of FIG. 2). Additionally, in some examples, instead of (or in addition to) the flow meter 230, a temperature sensor and/or a pressure sensor can be included to provide data characterizing the temperature and/or the pressure (e.g., stagnation pressure) of the system 100 which can be correlated with an expected velocity of the node 108. In any of these situations, the physical environment authenticator 124 can be configured/programmed to correlate the acceleration with the data corresponding to the expected fuel consumption to authenticate the environment of the node 108. In fact, acceleration can be correlated by the physical environment authenticator 124 with any other environmental parameter that can be shown to depend on and/or relate to acceleration.

Further, in examples where the node 108 employs an engine consuming fuel, the physical environment authenticator 124 can be configured/programmed to correlate position, velocity and acceleration to the mass flow rate of fuel. The mass flow rate of the fuel can also be correlated with such things as temperature and pressure either inside the node 108 (e.g. combustion chamber), or at a boundary between the node 108 and the external environment.

Figure 4:
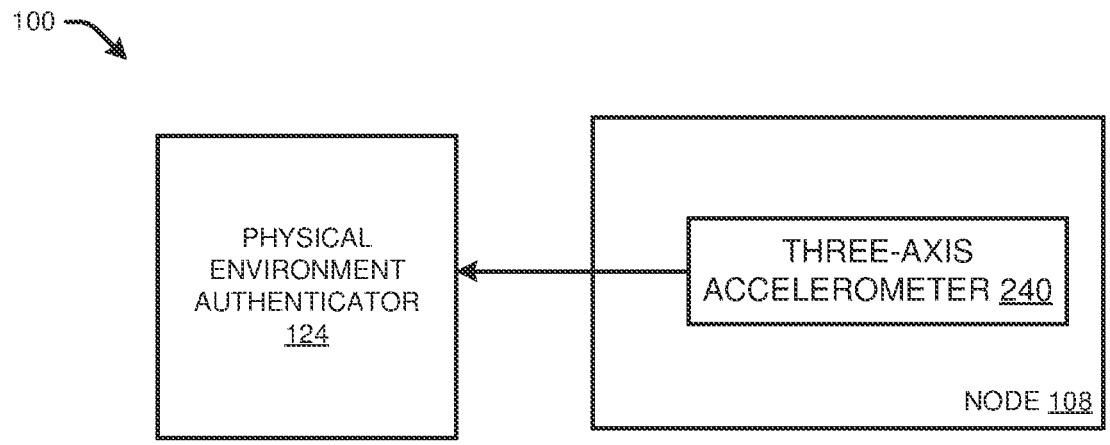
FIG. 4 illustrates an example of the system of FIG. 1 that includes a three-axis accelerometer.

FIG. 4 illustrates an example of the system 100 that includes a three-axis accelerometer 240 that provides data characterizing acceleration of the node 108 in three axes. The example of the system 100 of FIG. 4 can be employed, for example, in situations where the node 108 is implemented as a satellite, and the authorized environment is an orbital or sub-orbital ballistic trajectory around a celestial body while outside the Earth's atmosphere. In this situation, during the environmental verification process, the physical environment authenticator 124 can compare the acceleration in the three axes to determine if the node 108 is located in microgravity.

If the node 108 is in orbit or sub-orbit of a celestial body and is experiencing microgravity, all three axes provide an acceleration that is less than 0.25 g (corresponding to microgravity) for a time duration that is greater than a predetermined amount of time (e.g., greater than 1 minute). Thus, during the environmental verification process, the physical environment authenticator 124 can be configured/programmed to determine to authenticate the environment of the node 108 if the data from the three-axis accelerometer 240 indicates that all three axes provide an acceleration that is less than 0.25 g (e.g., microgravity) for a time duration of one minute or longer (e.g., the predetermined amount of time). Including the time duration would prevent an authorized party from simulating the effects of being in orbit or sub-orbit with a parabolic arc trajectory because such a trajectory would be limited to a time duration of about 30 seconds or less. Accordingly, in the example illustrated in FIG. 4, a single instance of an environmental sensor, namely the three-axis accelerometer 240 is employable to provide the plurality of environmental parameters needed in the environmental verification process.

Further, in some examples, the physical environment authenticator 124 can employ the three-axis accelerometer 240 to measure shock of the node 108. Shock is a transient physical effect, typically resulting from an impact or other sudden acceleration (e.g. explosion, etc.). Similar to acceleration, shock is a vector with the same kinds of units (rate of change of velocity). In some examples, the physical environment authenticator 124 includes logic for converting acceleration in the three axes of acceleration reported from the three-axis accelerometer 240 to derive a shock pulse for the node 108. The shock pulse can be characterized by a peak acceleration, duration, and shape of the pulse (triangular, trapezoidal, etc.). Moreover, in such a situation, during the environmental verification process, the physical environment authenticator 124 can correlate the shock of the node 108 with an acceleration directly measured by the three-axis accelerometer 240 to determine if the node 108 is operating in an authorized environment.

Further, in some examples, the physical environment authenticator 124 can employ the three-axis accelerometer 240 to derive a measured vibration of the node 108. Vibration is a situation in which the node 108 experiences oscillations in acceleration about an equilibrium point. Such oscillations may be either periodic or random. In some examples, the physical environment authenticator 124 includes logic for converting acceleration in the three axes of acceleration reported from the three-axis accelerometer 240 to derive a vibration for the node 108. Moreover, in such a situation, during the environmental verification process, the physical environment authenticator 124 can correlate the vibration of the node 108 with an acceleration directly measured by the three-axis accelerometer 240 to determine if the node 108 is operating in an authorized environment.

Figure 5:
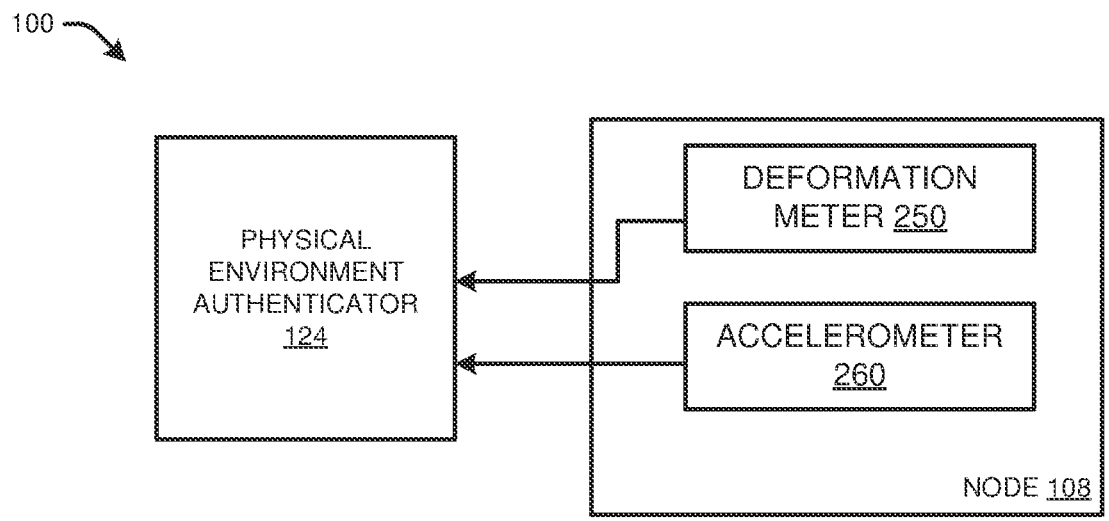
FIG. 5 illustrates an example of the system of FIG. 1 that includes a deformation meter and an accelerometer.

FIG. 5 illustrates an example of the system 100 that includes a deformation meter 250 that provides an environmental parameter characterizing a deformation of an element (e.g., a surface or a part) of the node 108 to the physical environment authenticator 124 and an accelerometer 260 that provides an environmental parameter characterizing an acceleration of the node 108 to the physical environment authenticator 124. In such a situation, the physical environment authenticator 124 can correlate acceleration with the deformation of the element of the node 108 with a stress of the node 108 that is calculated based on the acceleration of the node 108.

More generally, stress corresponding to a force applied over a given cross-sectional area can cause elastic deformation of the element of the node 108 that can be characterized by the deformation meter 250. This stress can be measured over time and can be correlated with a force applied to the node 108 that can be calculated based on the acceleration provided from the accelerometer 260. Normal stress is the stress arising from the force normal (or perpendicular) to a material cross section on which the stress acts. Similarly, shear stress is the stress arising from a force parallel to a cross section of the element of the node 108. Shear stress arises from shear forces, which are pairs of equal and opposing forces acting on opposite sides of an object. In some examples, fluids of the node (including both liquids and gases) moving along a solid boundary will incur a shear stress at that boundary, and so shear stress can be correlated to the velocity of the node 108 (which is derived from acceleration) in such a stream. Further, in some examples, the physical environment authenticator 124 can correlate shear stress to atmospheric dynamic pressure, and over time may also be correlated to temperature produced due to heating from friction. In these situations, a pressure sensor and/or a temperature sensor can be used in place of (or in addition to) the accelerometer 260.

In other examples, the deformation meter 250 can be employed to calculate a strain on the element of the node 108. The strain of the element corresponds to a permanent deformation of the element. The physical environment authenticator 124 can measure the strain over time, and the strain can be correlated with the acceleration (corresponding to the force) applied to the node 108. In most examples, strain occurs for materials which are put under stress over a period of time in which the force applied exceeds the elastic deformation range, such that permanent deformation of the material in the element the node 108 occurs. Accordingly, in these situations, the amount of strain can be correlated with the acceleration by the physical environment authenticator during the environmental verification process. In other examples, strain may be correlated with other environmental parameters, such as temperature, material strength, etc.

Figure 6:
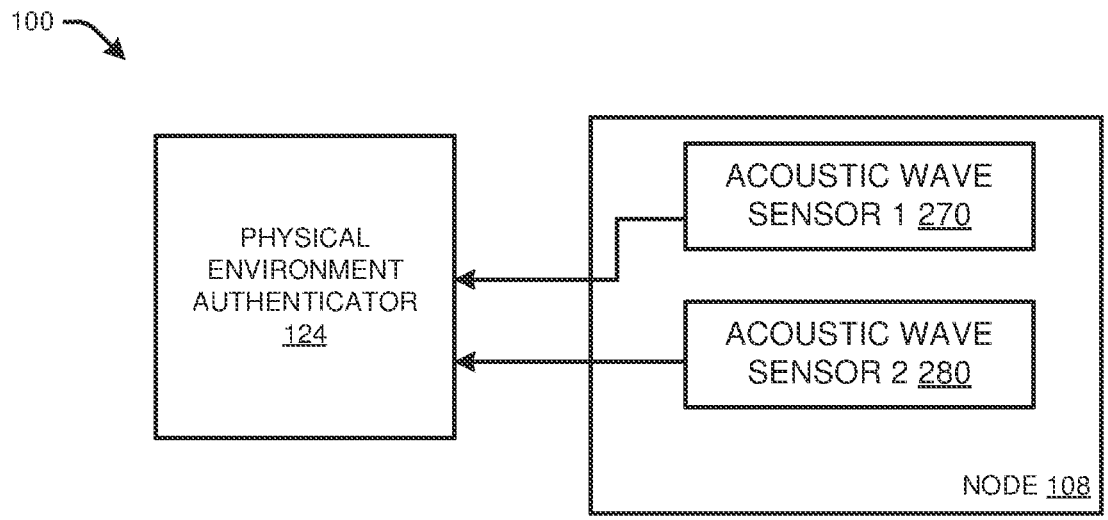
FIG. 6 illustrates an example of the system of FIG. 1 that includes acoustic wave sensors.

FIG. 6 illustrates an example of the system 100 that includes a first acoustic wave sensor 270 and a second acoustic wave sensor 280 that each provides an environmental parameter characterizing an acoustic wave measured at the node 108 to the physical environment authenticator 124. Acoustic waves manifests as mechanical waves which travel through various mediums such as gases, liquids, and solids and their generation, propagation, and reception of the node 108. The first acoustic wave sensor 270 and the second acoustic wave sensor 280 detect mechanical stresses as the acoustic wave propagates through the surface material of the node 108. More particularly, the first acoustic wave sensor 270 and the second acoustic wave sensor 280 measures amplitude and frequency characteristics of the acoustic wave by observing the propagation path and velocity through the node 108.

Characteristics changes in frequency and amplitude (or volume) of acoustic waves detected by the first acoustic wave sensor 270 and the second acoustic wave sensor 280 at the node 108 at specific time intervals can be used to confirm that the node 108 is operating in an authorized environment. Moreover, the first acoustic wave sensor 270 and the second acoustic wave sensor 280 can be tuned for different frequency ranges, in physically different places in the node 108 to provide directionality of the acoustic wave. In some examples, the physical environment authenticator 124 can correlate the detected acoustic wave with another environmental parameter measured by another environmental sensor (e.g., an accelerometer), such as shock, vibration, acceleration, velocity, pressure, etc. to execute the environmental verification process.

Figure 7:
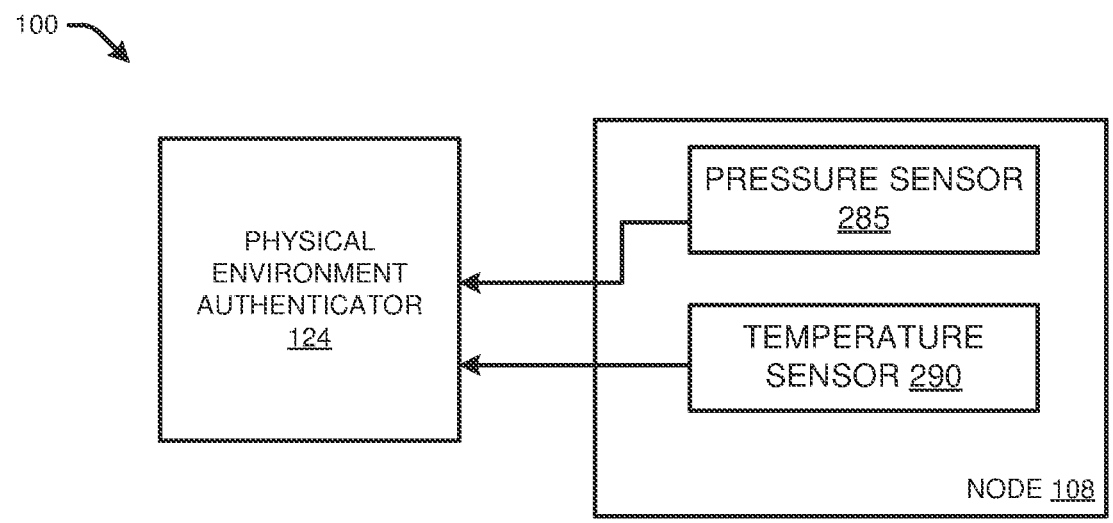
FIG. 7 illustrates an example of the system of FIG. 1 that includes a temperature sensor and a pressure sensor.

FIG. 7 illustrates an example of the system 100 that includes a pressure sensor 285 that provides an environmental parameter characterizing a pressure of a fuel consumed by the node 108 and a temperature sensor 290 that provides a temperature of the node 108 to the physical environment authenticator 124. In such a situation, the physical environment authenticator 124 can calculate an expected volume of the fuel based on the reported pressure of the fuel. In this example, the physical environment authenticator 124 can calculate an expected temperature of the system based on the calculated fuel volume, and the physical environment authenticator 124 can compare the expected temperature of the node 108 with the temperature measured by the temperature sensor 290 to execute the environmental verification process.

In such a situation, the physical environment authenticator 124 can calculate an expected volume of the fuel based on the reported pressure of the fuel. In this example, the physical environment authenticator 124 can calculate an expected temperature of the system based on the calculated fuel volume, and the physical environment authenticator 124 can compare the expected temperature of the node 108 with the temperature measured by the temperature sensor 290 to execute the environmental verification process. In other examples, additional or alternative environmental sensors, such as an accelerometer can provide environmental parameters that can be correlated with the measured pressure and/or temperature of the node 108.

Furthermore, in some examples, the pressure reported by the pressure sensor 285 can be employed to calculate a stagnation pressure for the node 108 and the temperature reported by the temperature sensor 290 can be employed to calculate a stagnation temperature for the node 108, as the node 108 travels through the atmosphere. In this situation, the stagnation pressure and the stagnation temperature can be correlated and employed during the environmental verification process.

Figure 8:
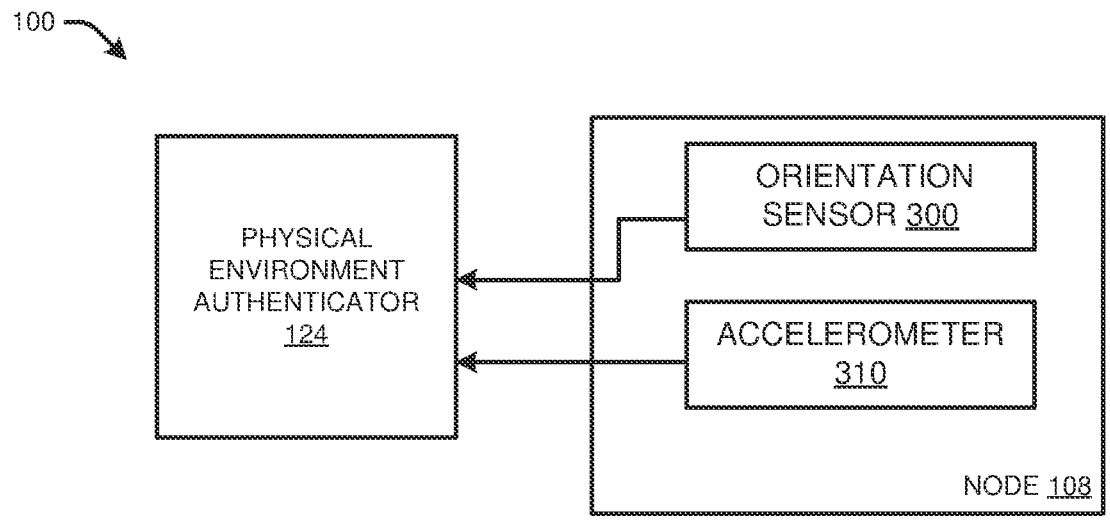
FIG. 8 illustrates an example of the system of FIG. 1 that includes an orientation sensor and an accelerometer.

FIG. 8 illustrates an example of the system 100 that includes an orientation sensor 300 that provides an orientation and/or an angular velocity of the node 108 to the physical environment authenticator 124 and an accelerometer 310 that provides an acceleration of the node 108 to the physical environment authenticator 124. The orientation sensor 300 can be implemented as a Micro Electro-Mechanical Systems (MEMS) gyroscope, a solid-state ring laser gyroscope, a fiber optic gyroscope, a quantum gyroscope, etc. In some examples, the orientation sensor 300 can be implemented as an air data probe. In other examples, the orientation sensor 300 can be integrated with an IMU.

As one example, the physical environment authenticator 124 can correlate the acceleration of the node 108 with the orientation of the node 108 to execute the environmental verification process. For instance, if the node 108 is implemented on a rocket, a high acceleration may be detected, but still correlated with a relatively constant orientation if the node 108 is operating in an authorized environment. Conversely, if an unauthorized party were to employ a centrifuge to attempt to provide a spoofed environment to simulate the acceleration, the orientation sensor 300 would report a constantly changing orientation, such that the physical environment authenticator 124 would not authenticate the spoofed environment.

In other examples, the orientation of the node 108 can be correlated with other environmental parameters, such as a flow stream around a body of the node 108. For example, if the node 108 is implemented as an aircraft, and the system 100 includes a flow meter (e.g., the flow meter 230 of FIG. 3), the physical environment authenticator 124 can determine an angle of attack for the node 108. The angle of attack can be correlated with an expected airflow over the body of the node 108 to authenticate the environment.

Figure 9:
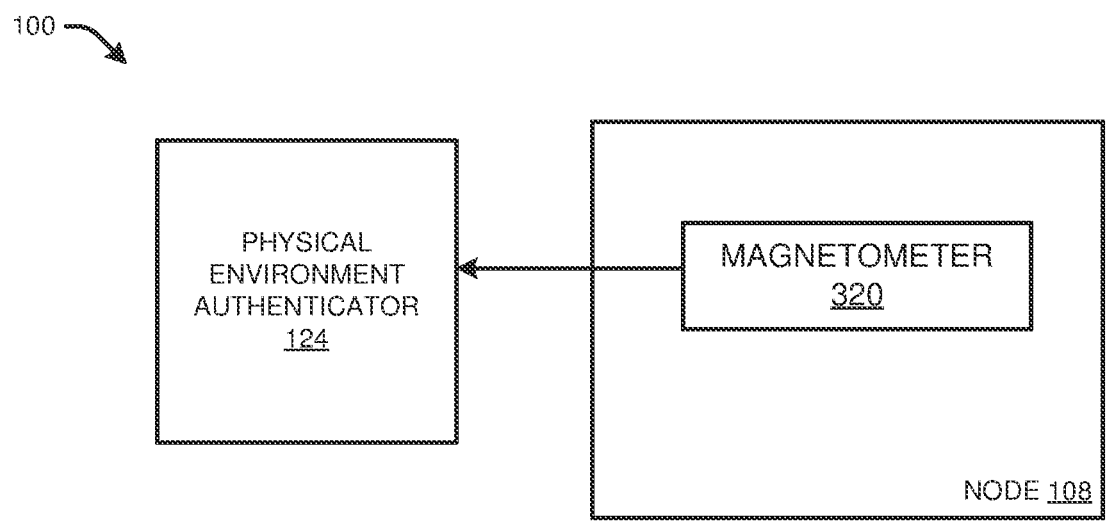
FIG. 9 illustrates an example of the system of FIG. 1 that includes a magnetometer.

FIG. 9 illustrates an example of the system 100 that includes an magnetometer 320 that provides a strength (magnitude) of a measured magnetic field of the node 108 to the physical environment authenticator 124. This magnitude of the magnetic field can be measured in three orthogonal dimensions such that the physical environment authenticator 124 can calculate a resulting measured magnetic field vector for the node 108. In examples in which the node 108 is in motion (when operating in the authorized environment), this magnetic field vector may be expected to change over time. In these situations, the physical environment authenticator 124 can correlate the magnetic field vector to other environmental parameters such as position and orientation (rotation) of the system. In fact, the magnetic field strength and orientation can be correlated with any other environmental parameter that depends on or relates to either the strength or orientation of the magnetic field to execute the environmental verification process.

Figure 10:
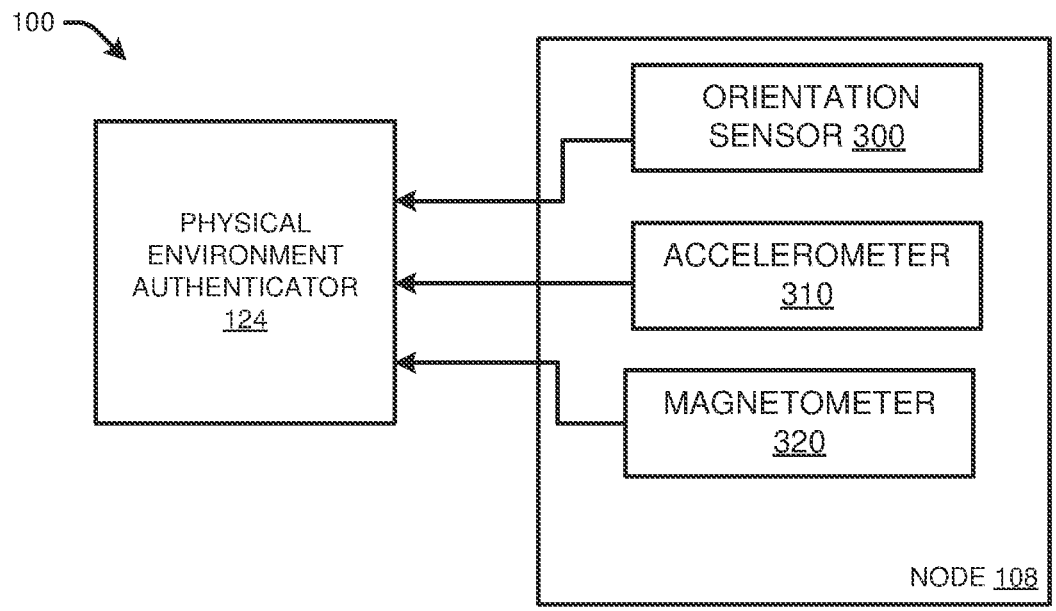
FIG. 10 illustrates an example of the system of FIG. 1 that includes an orientation sensor, an accelerometer and a magnetometer.

FIG. 10 illustrates an example of the system 100 that includes the orientation sensor 300 and the accelerometer 310 of FIG. 8 as well as the magnetometer 320 of FIG. 9. The orientation sensor 300 provides an orientation and/or an angular velocity of the node 108 to the physical environment authenticator 124 and the accelerometer 310 provides an acceleration of the node 108 to the physical environment authenticator 124. The magnetometer 320 provides a strength (magnitude) of a measured magnetic field of the node 108 to the physical environment authenticator 124. This magnitude of the magnetic field can be measured in three orthogonal dimensions such that the physical environment authenticator 124 can calculate a resulting measured magnetic field vector for the node 108.

In examples in which the node 108 is in motion (when operating in the authorized environment), the magnetic field vector measured by the magnetometer 320 may be expected to change over time. In these situations, the physical environment authenticator 124 can correlate the magnetic field vector to the orientation measured by the orientation sensor 300 and the acceleration measured by the accelerometer 310. Accordingly, if the node 108 is implemented on a rocket, a changing magnetic field and a high acceleration may be detected, but still is correlated with a relatively constant orientation if the node 108 is operating in an authorized environment. Conversely, if an unauthorized party were to employ a centrifuge to attempt to provide a spoofed environment to simulate the acceleration, the magnetometer 320 would report a changing magnetic field, but the orientation sensor 300 would report a constantly changing orientation, such that the physical environment authenticator 124 would not authenticate the spoofed environment. Accordingly, in this situation three independent, but correlated environmental conditions measured by three different sensors can be compared to authenticate the physical environment.

Figure 11:
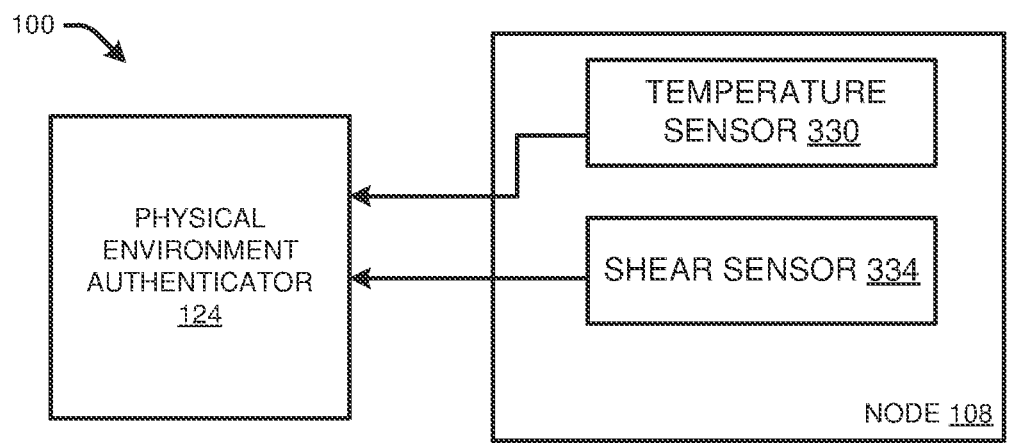
FIG. 11 illustrates an example of the system of FIG. 1 that includes a temperature sensor and a shear sensor.

FIG. 11 illustrates an example of the system 100 that includes a temperature sensor 330 that provides an environmental parameter characterizing a skin temperature of the node 108 to the physical environment authenticator 124 and a shear sensor 334 that provides an environmental parameter characterizing a shear force applied to an element (e.g., a surface or a part) of the node 108 to the physical environment authenticator 124. In such a situation, the physical environment authenticator 124 can correlate the skin temperature with the shear force of the element of the node 108. The node 108 can be representative of a rocket and the authorized environment can be the node 108 traveling through air.

In an example where the node 108 represents a rocket (or other projectile), sustained high velocity air flow (e.g., hypersonic flow corresponding to air flow greater than Mach 5) results in aerodynamic heating measurable by the temperature sensor 330. Moreover, the sustained high velocity air flow induces a relatively constant shear force on the element of the node 108 that can be measured with the shear sensor 334. Thus, the physical authenticator 124 can correlate an expected skin temperature of the node 108 with an expected relatively constant shear force of the element of the node 108.

Moreover, in efforts to spoof the authorized environment of the node 108 (a rocket traveling through air), an unauthorized party might employ a wind tunnel to simulate airflow over the node 108. However, air flow through such a wind tunnel would not be constant over a long enough period of time to raise the skin temperature of the node 108. Additionally, pulses of airflow (e.g., airflow that is not sustained) would cause corresponding pulses of shear force on the element of the node 108 that are measurable by the shear sensor 334. Accordingly, the physical environment authenticator 124 would be able to determine that the environmental parameters do not correlate with the authorized environment.

The examples provided in FIGS. 2-11 are not meant to be exhaustive. In fact, any measurable physical environmental parameter which is characteristic during part or all of the operation of the node 108 prior to granting access to the secret key 120 can be included in the set of environmental conditions which are authenticated. Some of the possible environmental parameters are relatively simple to spoof individually (e.g. temperature), but when combined with other environmental parameters, it may be infeasible for an unauthorized party to credibly spoof every correlated physical parameter unless the node 108 is operating in the authorized environment.

Furthermore, the examples of environmental sensors illustrated in FIGS. 2-9 can be combined in many different ways. As explained, increasing the number of correlated physical parameters increases security by increasing the difficulty of spoofing the authorized environment. The number and types of correlated physical parameters can be selected, for example, based on the sensitivity of the encrypted data 132 of FIG. 1.

Figure 12:
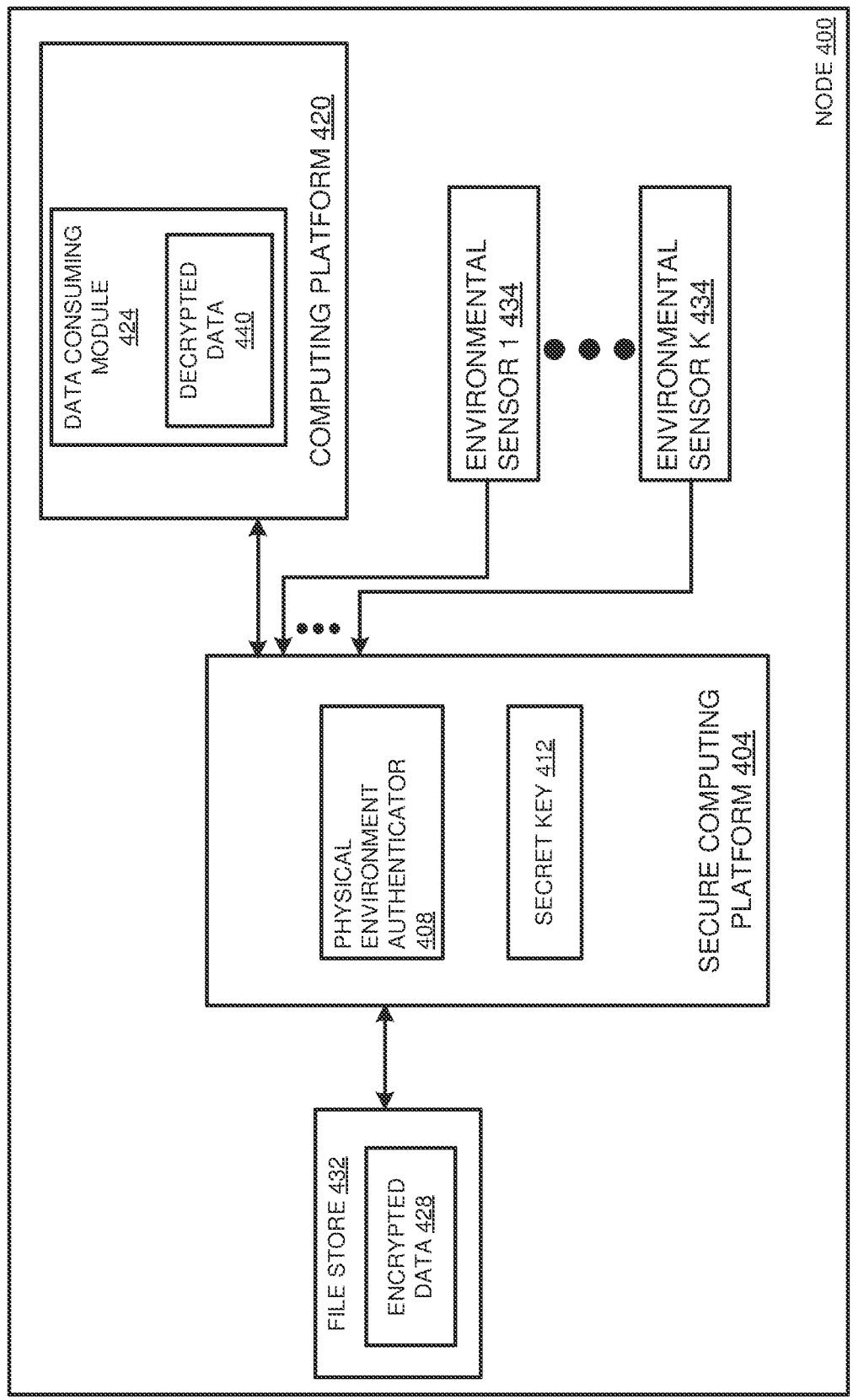
FIG. 12 illustrates an example of a node that includes features to employ environmental verification to control access to data.

FIG. 12 illustrates an example of a node 400 that includes the components of the system 100 of FIG. 1. As some examples, the node 400 can be implemented as a vehicle (terrestrial vehicle or an aircraft), a rocket, satellite, a weapon (e.g., a missile), etc. In some examples, theft of the node 400 can represent a national security risk. The node 400 includes features for controlling access to secure content based on an environmental verification. The node 400 can include a secure computing platform 404 that can be employed to implement the secure computing platform 104 of FIG. 1. For purposes of simplification of explanation, some details of the secure computing platform 404 have been omitted. The secure computing platform 404 includes a physical environment authenticator 408 executing thereon.

The physical environment authenticator 408 can execute an environmental verification process that verifies that the node 108 is operating in an authorized environment. The secure computing platform 404 includes a secret key 412 stored thereon. The physical environment authenticator 408 is configured such that if the physical environment authenticator 408 verifies that the node 400 is operating in the authorized environment during the environmental verification process, that access (direct or indirect) to the secret key 412 is granted. Conversely, if the physical environment authenticator 408 cannot verify that the node 400 is operating in the authorized environment, the access to the secret key 412 is denied. The secret key 412 can be a symmetric key or an asymmetric key of an asymmetric key pair. In either situation, the secret key 412 is not revealed to an outside entity. Instead, the secret key 412 can be employed to decrypt data onboard the secure computing platform 404.

The node 400 can include a computing platform 420 that can be employed to implement the computing platform 152 of FIG. 1. That is, the computing platform 420 can include a non-transitory memory that stores data and machine readable instructions, as well as a processing unit (one or more processor cores) for accessing the memory of the computing platform 420 and executing the machine readable instructions. In some examples, the computing platform can include a data consuming module 424 (e.g., application software) that needs access to the data in order for the node 400 to properly operate. The data can be stored in encrypted form as encrypted data 428. The encrypted data 428 can be stored in a file store 432, which can be included on the node 400 in the example illustrated. The encrypted data 428 can only be decrypted with the secret key 412. Accordingly, without access to the secret key 412 being granted, the encrypted data is unintelligible.

The physical environment authenticator 408 receives the request for the data. In response, the physical environment authenticator 408 executes the environmental verification process to verify whether the node 400 is operating in the authorized environment. The environmental verification process verifies that the node 108 is located within the expected environment at the time the request to decrypt the encrypted data 132 is received.

To execute the environmental verification process, the physical environment authenticator 408 captures and compares data characterizing at least two environmental parameters of the environment of the implementation for the node 400. Accordingly, the node 400 can include K number of environmental sensors 434. Each of the K number of environmental sensors 434 measures a different type of environmental parameter and the K number of environmental sensors 434 can be employed to implement the environmental sensors 160 of FIG. 1. Each of the K number environmental sensors 434 can be implemented in a manner similar to the examples provided in FIGS. 2-9. As some examples, the K number of environmental sensors 434 can include, but are not limited to an accelerometer, an IMU, a GNSS (or other position sensor), an orientation sensor, a temperature sensor, a pressure sensor, a flow meter sensor, a velocity sensor, an acoustic wave sensor, etc. This list is not meant to be exhaustive. In the various examples including the examples described herein, any two environmental sensors that measure correlated environmental parameters can be employed. In the example illustrated, each of the K number of environmental sensors 434 are integrated with the node 400, but in other examples, each of the K number of environmental sensors 434, or some subset thereof, are external to the node 400. In such a situation, the environmental sensors 434 are positioned throughout the node 400. Moreover, although FIG. 12 illustrates the K number of environmental sensors 434 as communicating with the secure computing platform 404, in some examples, the K number of environmental sensors 434 can additionally communicate with the computing platform 420 and/or other components of the node 400.

Each of the K number of environmental sensors 434 provides data characterizing a parameter of the environment in which the node 400 is implemented at or near the time the request for decryption of the decrypted data is provided to the physical environment authenticator 408. During the environmental verification process, the physical environment authenticator 408 can compare data characterizing two correlated environmental parameters to determine if the node 108 is operating in an authorized environment. In some examples, such as a situation where the node 400 includes only one environmental sensor 434, the environmental sensor 434 can be configured to measure two different environmental parameters and provide the data for the two different environmental parameters to the physical environment authenticator 408. In other examples, there are multiple environmental sensors 434 that each operate independently.

As noted, the data for the two different environmental parameters is correlated. In some examples, the physical environment authenticator 408 can transform one or more of the two different environmental parameters to form a common environmental parameter. If the plurality of correlated environmental parameters are different, but the correlated environmental parameters is within an acceptable range, the physical environment authenticator 408 retrieves the encrypted data 428 and requests that the encrypted data 428 be decrypted with the secret key 412 by a crypto engine (not show). In response, the physical environment authenticator 408 receives decrypted data 440 that is provided to the data consuming module 424. In this manner, the decrypted data 440 can be consumed by the data consuming module 424 or other module (e.g., application software) in the node 400.

Conversely, in a situation where the comparison of the data characterizing the environmental parameters provided by the K number of environmental sensors 434 indicates that the node 400 is not located in the authorized environment, the physical environment authenticator 408 does not grant access to the secret key 412. In some situations, the physical environment authenticator 408 can provide a notification that access to the encrypted data 428 (in unencrypted form) has not been authorized in response to the request for the data. In other examples, the physical environment authenticator 408 may not respond to the request to decrypt the encrypted data 428 if the physical environment authenticator cannot verify that the node 400 is located in an authorized environment.

The node 400 can prevent an unauthorized party (e.g., a thief or adversarial party) that may physically possess the node 400 from accessing the secret key 412 and the encrypted data 428 in unencrypted form. Moreover, as explained in the examples illustrated in FIGS. 2-9, by employing multiple environmental parameters, it can become infeasible to spoof the authorized environment. Moreover, the number and type of environmental parameters correlated in the environmental verification process can be commensurate with the sensitivity of the data (the decrypted data 440).

Figure 13:
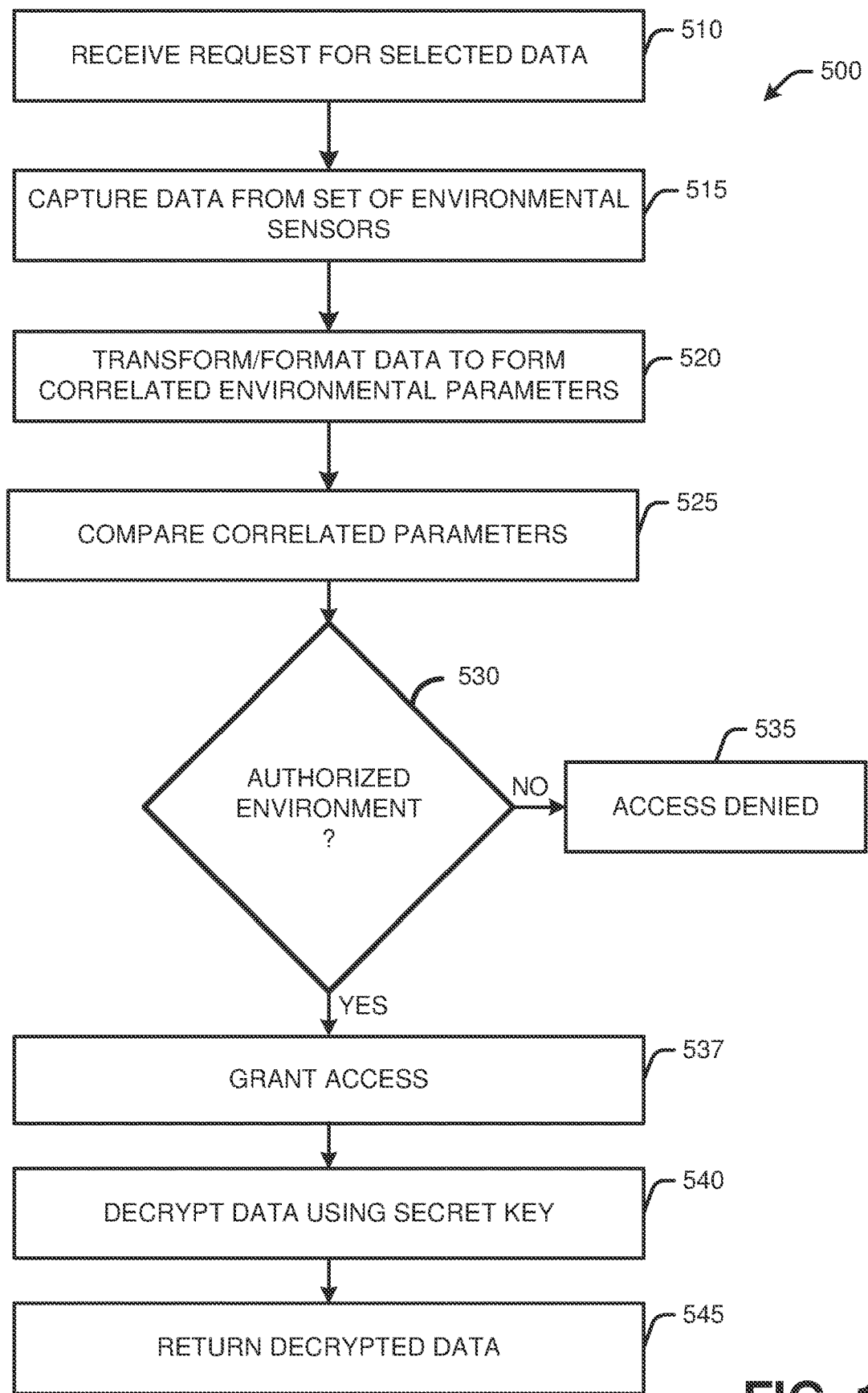
FIG. 13 illustrates a flowchart of an example method that employs environmental verification to control access to data.

In view of the foregoing structural and functional features described above, an example method will be better appreciated with reference to FIG. 13. While, for purposes of simplicity of explanation, the example method of FIG. 13 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 13 can be implemented as instructions stored in a non-transitory machine-readable medium. The instructions can be accessed by a processing resource (e.g., one or more processor cores) and executed to perform the methods disclosed herein.

FIG. 13 illustrates an example of a method 500 for controlling access to data. The method 500 can be implemented, for example, by the secure computing platform 104 of the system 100 of FIG. 1 and/or the computing platform 404 of the node 400 of FIG. 12. In such a situation, the secure computing platform 104 can include a physical environment authenticator (e.g., the physical environment authenticator 124 of FIG. 1 and/or the physical environment authenticator 408 of FIG. 10) executing thereon.

At 510, an access portal (e.g., the access portal 144 of FIG. 1) of the physical environment authenticator receives a request for data from a computing platform (e.g., the computing platform 152 of FIG. 1). At 515, in response to the request, the physical environment authenticator captures data characterizing at least two environmental parameters from a set of environmental sensors (e.g., the K number of environmental sensors 160 of FIG. 1 and/or the K number of environmental sensors 434 of FIG. 12). At 520, the physical environment authenticator transforms and/or formats the data to form correlated environmental parameters. The formatting and/or transforming can include, for example application of formulas to apply the laws of physics to different environmental parameters (e.g., change units of measurement).

At 525, the physical environment authenticator can compare the correlated parameters. Comparison of the correlated parameters can be a direct comparison, or a comparison of expected values. At 530, based on the comparison, the physical environment authenticator can determine whether the node is operating in an authorized environment. If the determination at 530 is negative (e.g., NO), the method 500 proceeds to 535. If the determination at 530 is positive (e.g., YES), the method 500 proceeds to 537. At 535, the physical environment authenticator denies access to the data.

At 537, access to the data is granted. At 540, a crypto engine (e.g., the crypto engine 128 of FIG. 1) employs a secret key (e.g., the secret key 120 of FIG. 1) to decrypt encrypted data (e.g., the encrypted data 132 of FIG. 1) that can only be decrypted with the secret key to reveal decrypted data, which corresponds to the data. The secret key is securely stored in the secure computing platform. At 545, the physical environment authenticator returns the decrypted data (corresponding to the data) to the computing platform of the node, such that a module (e.g., application software) on the node can consume the decrypted data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for controlling access to data based on environmental verification, the system comprising:
    a non-transitory memory having machine executable instructions; and
    a processing unit for accessing the machine readable instructions, the machine readable instructions comprising:
    a physical environment authenticator that:
        receives data characterizing environmental parameters of a node in an environment from a set of environmental sensors; and
        transforms and/or formats a first environmental parameter provided from a first environmental sensor of the set of environmental sensors into a unit of measurement employed to characterize a second environmental parameter provided from a second environmental sensor of the set of environmental sensors to form the plurality of correlated environmental parameters; and
        compares correlated environmental parameters with each other and/or a threshold value, wherein at least a subset of the correlated environmental parameters are based on the data from the set of environmental sensors and grants access to data if the correlated environmental parameters indicate that the node is operating in an authorized environment and prevents access to the data if the correlated environmental parameters indicates that the node is not operating in an authorized environment.

2. The system of claim 1, further comprising a root of trust server that executes a trusted boot to verify that the physical environment authenticator has not been modified.

3. The system of claim 1, wherein the physical environment authenticator receives a decrypted data from a crypto engine and provides the decrypted data to the node.

4. The system of claim 1, wherein the set of environmental sensors are integrated on an application specific integrated circuit (ASIC) chip.

5. The system of claim 1, wherein the first environmental parameter is a shear force applied to the node and the second environmental parameter is temperature of the node.

6. The system of claim 1, wherein the first environmental parameter is acceleration of the node and the second environmental parameter is volume of fuel consumed by the node.

7. The system of claim 1, wherein the first environmental sensor is a global navigation satellite system (GNSS) receiver and the second environmental sensor is an inertial measurement unit (IMU).

8. The system of claim 1, wherein the first environmental sensor is a global navigation satellite system (GNSS) receiver and the second environmental sensor is an accelerometer.

9. The system of claim 1, wherein the first environmental sensor is an accelerometer that measures an acceleration of the node and the second environmental sensor is one of a mass flow rate meter, a temperature sensor and a pressure sensor.

10. The system of claim 1, wherein the first environmental sensor is an accelerometer that measures an acceleration of the node and the second environmental sensor is a deformation meter that measures a deformation of a surface of the node.

11. The system of claim 1, wherein the first environmental parameter characterizes a shock or vibration of the node and the second environmental parameter characterizes an acceleration of the node.

12. The system of claim 1, wherein the first environmental parameter characterizes a stress or strain of the node and the second environmental parameter characterizes an acceleration of the node.

13. The system of claim 1, wherein the first environmental parameter characterizes a first acoustic wave propagating through the node at a first frequency and the second environmental parameter characterizes one of a shock, vibration, acceleration, velocity and pressure of the node.

14. The system of claim 1, wherein the first environmental parameter characterizes a volume of a fuel at the node and the second environmental parameter characterizes an acceleration of the node.

15. The system of claim 1, wherein the first environmental parameter characterizes an angle of attack of a body the node and the second environmental parameter characterizes a velocity of a flow stream around the body of the node.

16. The system of claim 1, wherein the first environmental parameter characterizes a stagnation temperature of a fluid for the node and the second environmental parameter characterizes a stagnation pressure of the fluid for the node.

17. The system of claim 1, wherein the first environmental parameter characterizes a mass flow rate of a fuel for the node and the second environmental parameter characterizes at least one of a position, a velocity and an acceleration of the fuel for the node.

18. The system of claim 1, wherein the first environmental parameter characterizes an orientation of a magnetic field for the node and the second environmental parameter characterizes a position or orientation of the node.

19. The system of claim 1, wherein the first environmental parameter characterizes an orientation of a magnetic field for the node and the second environmental parameter characterizes a position or orientation of the node, and a third environmental sensor of the set of environmental sensors measures a third environmental parameter that characterizes time.

20. The system of claim 1, wherein the set of environmental parameters comprises a three-axis accelerometer and the plurality of correlated environmental parameters comprises acceleration of the node in three different axes, wherein the physical environment authenticator grants access to the data if the acceleration of the node in the three different axes corresponds to microgravity for a predetermined duration of time.

21. The system of claim 1, wherein a given environmental sensor of the set of environmental sensors is physically detached from the node, and the data from the given environmental sensor is wirelessly transmitted to the physical environment authenticator.

22. The system of claim 1, wherein each environmental sensor in the set of environmental sensors measures the same environmental parameter.

23. The system of claim 1, wherein the physical environment authenticator further scores each of the correlated environmental parameters, and the physical environment authenticator grants access to the data if the score for M number of the correlated environmental parameters meets a corresponding threshold score, where M is an integer greater than or equal to two, and if the score for N number of the correlated environmental parameters are below a corresponding threshold score, and N is an integer greater than or equal to one.

24. The system of claim 1, wherein the physical environment authenticator grants access to a secret key that is employable to decrypt an encrypted form of the data in response to the correlated environmental parameters indicating that the node is operating in the authorized environment.

25. A non-transitory machine readable medium having machine executable instructions, the machine executable instructions comprising:
a physical environment authenticator that:
receives a request for access to data from a node;
captures, in response to the request, data characterizing a plurality of environmental parameters of the node from a set of environmental sensors; and
scores each of the correlated environmental parameters, and the physical environment authenticator grants access to the data if the score for M number of the correlated environmental parameters meets a corresponding threshold score, where M is an integer greater than or equal to two, and if the score for N number of the correlated environmental parameters are below a corresponding threshold score, and N is an integer greater than or equal to one; and
compares the plurality of correlated environmental parameters with each other and/or a threshold value, wherein at least a subset of the correlated environmental parameters are based on data from the sets of environmental sensors and grants access to data if the plurality of correlated parameters from each of the set of environmental sensors indicate that the node is operating in an authorized environment and denies access to the data if at least one of the environmental parameters indicates that the node is not operating in the authorized environment.

26. The non-transitory medium of claim 25, further comprising a root of trust server that executes a trusted boot and verifies that the physical environment authenticator has not been modified.

27. The non-transitory medium of claim 25, wherein the physical environment authenticator provides a decrypted data to a computing platform on the node.

28. The non-transitory medium of claim 25, wherein a first environmental sensor of the set of environmental sensors measures a first environmental parameter, and a second environmental sensor of the set of environmental sensors measures a second environmental parameter different from the first environmental parameter.

29. The non-transitory medium of claim 25, wherein a given sensor of the set of environmental sensors is physically detached from the node, and the data from the given sensor is wirelessly transmitted to the physical environment authenticator.

30. The non-transitory medium of claim 25, wherein at least two environmental sensors in the set of environmental sensors sensor measure the same environmental parameter.

31. The non-transitory medium of claim 25, wherein the physical environment authenticator transforms, formats and/or fuses one or more of the plurality of environmental parameters such that each of the plurality of environmental parameters are correlated.

32. The non-transitory medium of claim 25, wherein a crypto engine decrypts the encrypted data using a secret key in response to the physical environment authenticator granting access to the data.

33. A method for controlling access to data based on environmental verification comprising:
receiving, by a physical environment authenticator executing on a secure computing platform, a request for access to data from a node;
capturing, by the physical environment authenticator, in response to the request, data characterizing a plurality of environmental parameters of the node from a set of environmental sensors; and
transforming and/or formatting a first environmental parameter provided from a first environmental sensor of the set of environmental sensors into a unit of measurement employed to characterize a second environmental parameter provided from a second environmental sensor of the set of environmental sensors to form the plurality of correlated environmental parameters; and comparing, by the physical environment authenticator, a plurality of correlated environmental parameters with each other and/or a threshold value, wherein at least a subset of the correlated environmental parameters are based on data from the set of environmental sensors, and grants access to data if the plurality of correlated parameters from each of the set of environmental sensors indicate that the node is operating in an authorized environment and denies access to the data if at least one of the environmental parameters indicates that the node is not operating in the authorized environment.

34. The method of claim 33, further comprising decrypting, by a crypto engine of the secure computing platform, an encrypted form of the data using a secret key in response to the access to the data being granted.

\* \* \* \* \*

UNITED STATES PATENT AND TRADEMARK OFFICE
CERTIFICATE OF CORRECTION

PATENT NO. : 11,722,903 B2
APPLICATION NO. : 17/226552
DATED : August 8, 2023
INVENTOR(S) : Steven D. Ratts et al.

It is certified that error appears in the above-identified patent and that said Letters Patent is hereby corrected as shown below:

On the Title Page

Item (72) Inventors:
Reads "Steven D. Ratts, Indian Harbour Beach, FL (US); Brian J. Noe, Indian Harbour Beach, FL (US); Kathryn E. Schmidt, Melbourne, FL (US); Alexander J. Voce, Melbourne, FL (US); Albert C. Stevens, St. Augustine, FL (US); Michael Scholz, Melbourne, FL (US)"
Should Read -- Steven D. Ratts, Indian Harbour Beach, FL (US); Brian J. Noe, Indian Harbour Beach, FL (US); Kathryn E. Schmidt, Melbourne, FL (US); Alexander J. Voce, Melbourne, FL (US); Albert C. Stevens, St. Augustine, FL (US); Michael Schloz, Melbourne, FL (US) --

Signed and Sealed this
Third Day of October, 2023

Katherine Kelly Vidal
*Director of the United States Patent and Trademark Office*